Nov. 9, 1965

E. PRONO ETAL 3,216,438

PRESSURE ACTUATED VALVE

Filed May 10, 1961

INVENTORS
EDWARD PRONO
HOLDRIDGE W. MARSH
JOHN R. CONYERS

BY Thomas S. MacDonald

ATTORNEY

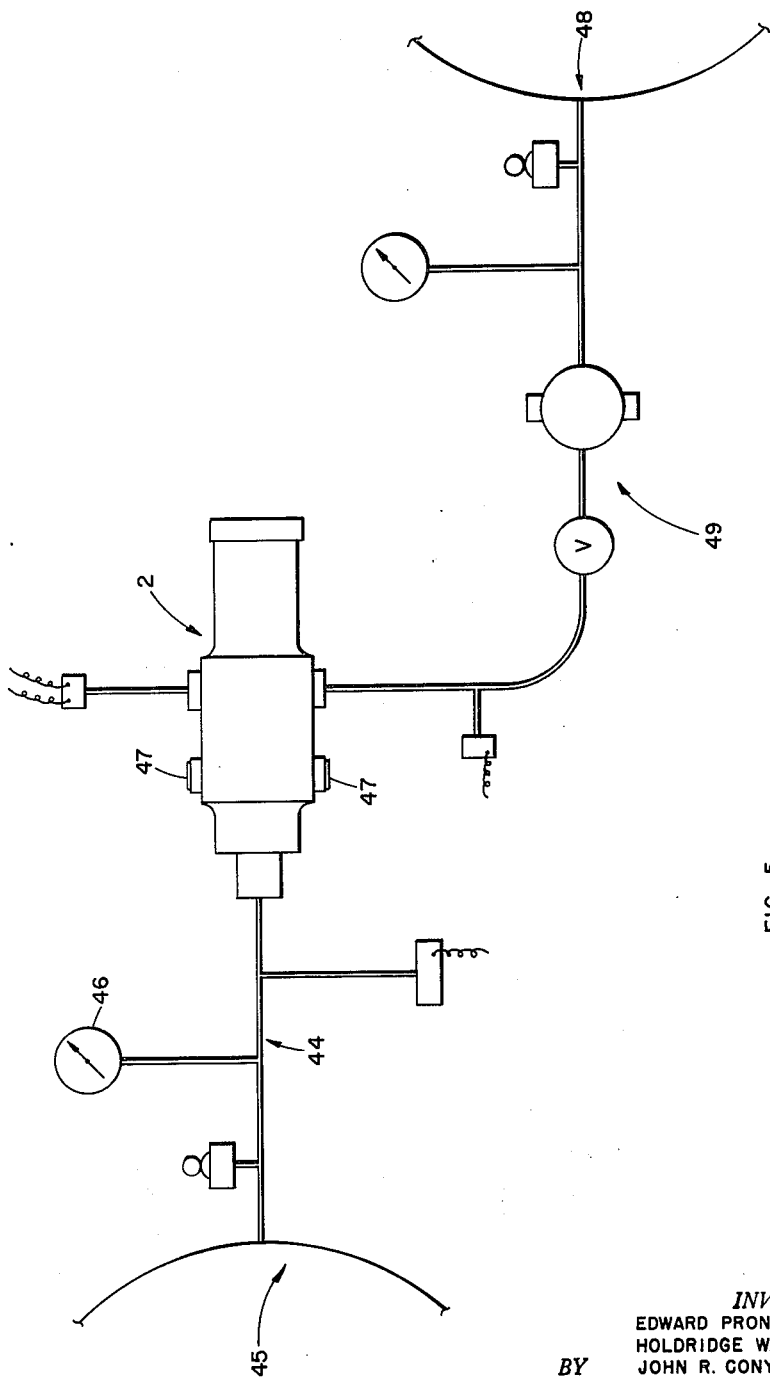

Nov. 9, 1965  E. PRONO ETAL  3,216,438
PRESSURE ACTUATED VALVE
Filed May 10, 1961  3 Sheets-Sheet 3

INVENTORS
EDWARD PRONO
HOLDRIDGE W. MARSH
JOHN R. CONYERS
BY
Thomas S. MacDonald
ATTORNEY

United States Patent Office 3,216,438
Patented Nov. 9, 1965

3,216,438
PRESSURE ACTUATED VALVE
Edward Prono, Glendale, Holdridge W. Marsh, Woodland Hills, and John R. Conyers, Thousand Oaks, Calif., assignors to North American Aviation, Inc.
Filed May 10, 1961, Ser. No. 109,208
5 Claims. (Cl. 137—68)

This invention relates to a pressure actuated valve and particularly relates to an expeditiously actuated valve adapted for long term storage of highly pressurized fluids.

The term "valve" as used herein should be broadly construed and understood to mean a device wherein the flow of a fluid or other constituent may be selectively started, stopped or otherwise regulated by means of a movable part which opens, shuts or partially obstructs one or more ports or passageways.

The storage of highly pressurized fluids requires the utilization of a valve mechanism which may be expeditiously actuated to permit the expeditious release of such fluids. The valve must also function to prevent the detrimental leakage of such highly pressurized fluids during the storage interim and in many applications during the actuation thereof as well. The problem is greatly magnified when such highly pressurized fluids are necessarily stored over a long period of time, for example, ten years. Such is the case in many of the modern day rocket engine applications wherein highly pressurized rocket propellant constituents must be stored over a long period of time, during which time such constituents must be positively retained so that the pressure of such constituents does not decay. It is further important in many applications that upon the release of such constituents that the valve does not inadvertently shut off since such a malfunction would obviously severely curtail the operational efficiency of the rocket engine.

Many prior art valve structures have been proposed to solve the above stated problems. However, such prior art devices generally include either a detent type sealing means or a conventional type burst diaphragm. The detent type shut off mechanism is particularly susceptible to leakage during severe vibrational environments and further functions to restrict the desired flow of the exhaust pressurized fluid. Also, the conventional burst diaphragm concept has not proved an adequate solution hereto since it cannot be readily ascertained at what particular pressure the burst diaphragm will break. Also, the exact outflow area afforded subsequent to the breaking of the burst diaphragm cannot be accurately precalculated. Furthermore, the portions of the broken diaphragm which disassociate from the cooperating retaining structure tend to flow along with the pressurized fluid thus, giving rise to the possibility of damage to a rocket engine, for example.

The present invention has overcome many of the above prior art deficiencies. This invention provides an expeditiously and instantaneously actuated valve formed on a longitudinal axis comprising a member having a passage formed on said axis adapted to contain a fluid therein. The member also comprises a first hollow portion adapted to be fixedly secured to a supporting structure; a second tubular portion extending from said first hollow portion, said first and second portions constructed and arranged to form said passage. The member further comprises means attached to said second portion for selectively placing said second portion in sufficient tension to cause a breaking thereof when said means is urged away from said first portion with a predetermined force.

An object of this invention is to provide a valve which may be expeditiously opened.

A further object of this invention is to provide a pressure actuated valve which is capable of preventing the leakage of highly pressurized fluid which fluid is stored for a relatively long duration.

A still further object of this invention is to provide a pressure actuated valve which may be expeditiously actuated to permit fluid flow therethrough and be positively retained in such an opened position.

A still further object of this invention is to provide a pressure actuated valve which may be subjected to relatively high vibrational environments and extremely high actuating pressures without effecting the operation thereof.

A still further object of this invention is to provide a pressure actuated valve wherein a discharged fluid medium is positively sealed during all modes of operation thereof.

These and other objects of this invention will become apparent from the following description taken in connection with the accompanying drawings, in which.

Figure 4:
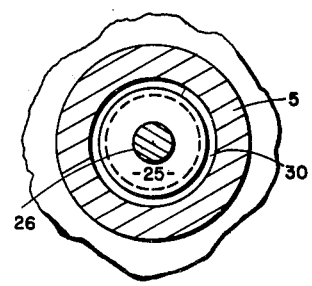
FIG. 4 is a cross-sectional view taken on lines 4—4 of FIG. 3.
Figure 2:
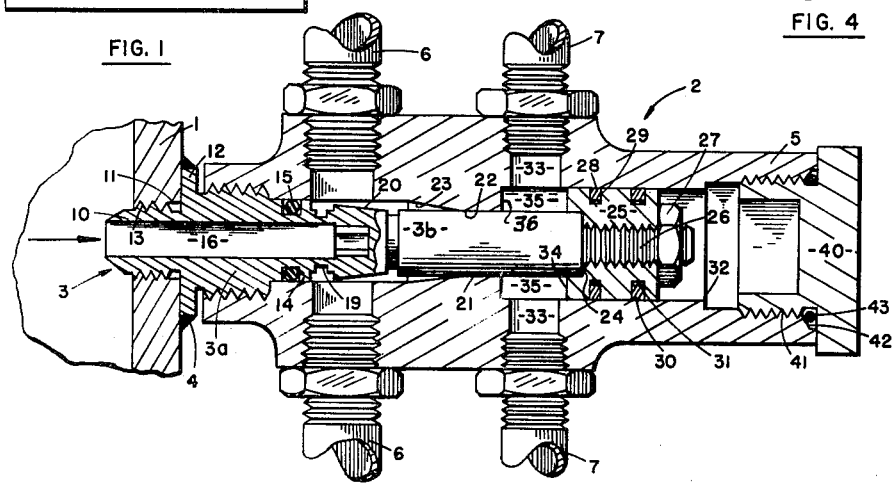
FIG. 2 is a longitudinal cross-sectional view disclosing the preferred valve embodiment employed in the system of FIG. 1, constructed and arranged prior to the actuation thereof.
Figure 3:
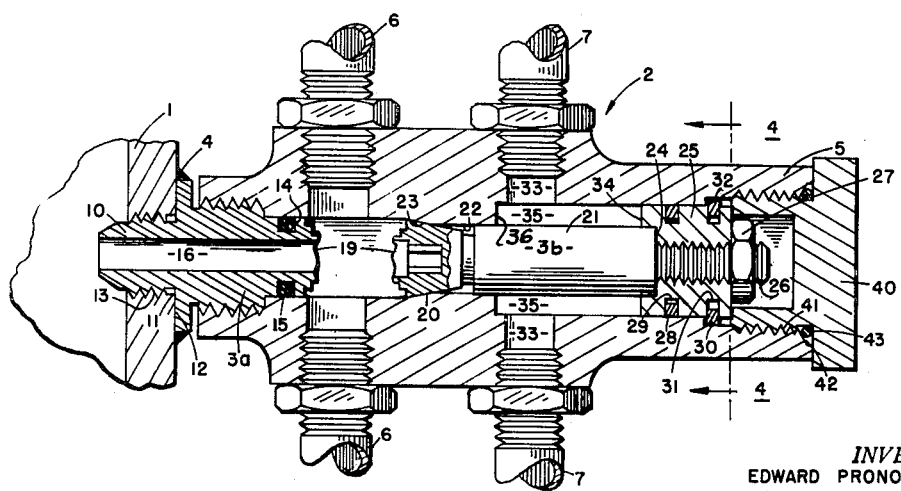
FIG. 3 is a longitudinal cross-sectional view similar to FIG. 2 disclosing the valve in operative or open position.

FIG. 5 discloses a schematically illustrated testing circuit utilized to determine the performance characteristics of the valve embodiment of FIGS. 2–4 inclusive.

Figure 6:
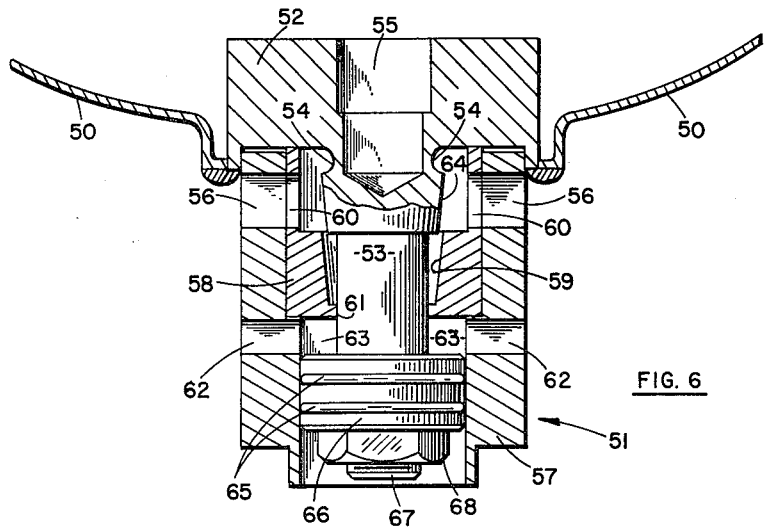

FIG. 6 is a longitudinal cross-sectional view disclosing a valve embodiment substantially employing the novel concepts of this invention as disclosed in the valve embodiment of FIGS. 1–4 inclusive.

Figure 7:
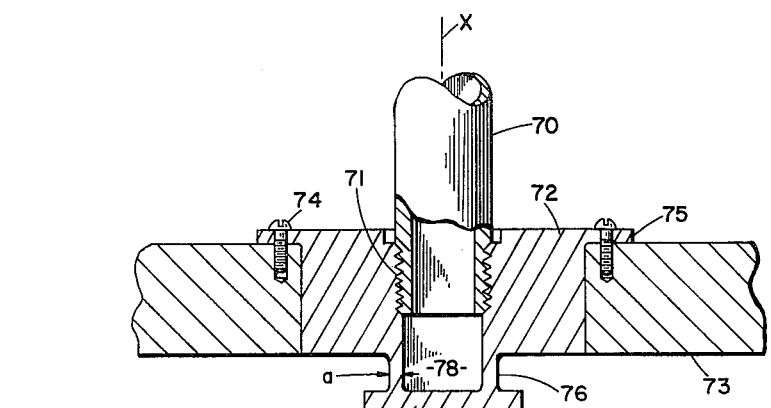

FIG. 7 is a longitudinal cross-sectional view disclosing a sub-combination type valve embodiment employing the novel concepts of this invention as disclosed in FIGS. 1–6 inclusive.

Figure 8:
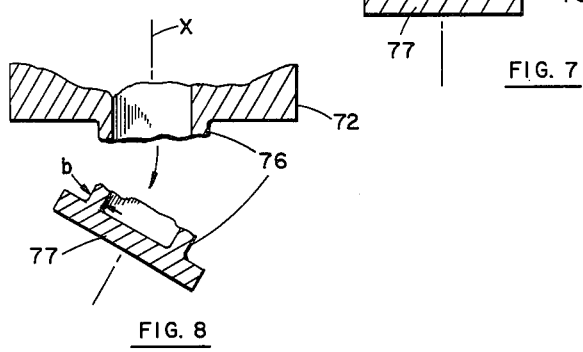

FIG. 8 is a partial longitudinal cross-sectional view disclosing the valve embodiment of FIG. 7 subsequent to the actuation thereof.

The purpose of this invention is to provide a pressure actuated valve comprising a housing having outlet port means formed adjacent a first end therein and an actuating member mounted in said housing. Said actuating member comprises a first portion operatively secured to said housing and a second portion connected to said first portion by a rupture means which functions to permit the separation and axial movement of second portion relative to said first portion which said second portion is subjected to a predetermined axial force. Lock means may be optionally cooperatively formed on said member and on said housing for locking the subsequently moved second portion of said actuating member so as to assure the unrestricted flow of fluid during all operational phases of the valve. Sealing means may also be optionally cooperatively formed on said member and said housing to simultaneously prevent fluid flow thereby when said second portion breaks and moves away from said first portion into locking position.

Figure 1:
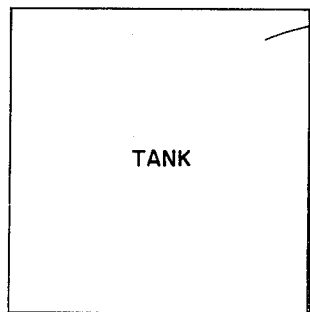
FIG. 1 is a schematic showing of a pressurized fluid tank system operatively connected to a preferred relatively sophisticated valve embodiment employing the novel concepts of this invention.

A preferred illustrative embodiment of this invention is schematically ilustrated in FIG. 1 and is shown in combination with a fluid retaining tank 1. The tank 1 is particularly adapted to store a highly pressurized gas or liquid over a relatively long period of time. A valve assembly generally noted at 2 is securely fastened to the pressurized fluid retaining tank 1 by means of a longitudinally extending member generally noted at 3. The member 3 is secured at 4 to said tank and extends therefrom into the valve housing or casing 5 as shown. The member 3 may be positively connected to tank 1 by any conventional means. For illustration purposes, a circumferential weld bead 4 is shown so as to provide for a rigid securance thereat during all phases of valve operation when required.

Two juxtaposed outlet ports 6 are formed operatively integral with the housing 5 and function to receive and transmit the pressurized fluid contained in tank 1 to a desired exterior location. The desired configuration and number of such outlet ports is a matter of choice depending on the specific work assignment. For example, one such outlet port may be utilized, if so desired.

Actuating mechanisms 7 are operatively connected to the housing 5 of valve assembly 2 and preferably comprise a conventional type pyrotechnic cartridge. Such cartridges function to discharge a highly pressurized gas when actuated by means of the electrical connections 8. Such conventional type actuating cartridges are shown, for example, in U.S. Patent No. 2,365,364. Although two such cartridges have been shown for illustration purposes, it should be understood that the number employed comprises a matter of choice, depending on the operational requirements. Furthermore, other conventional type pressure actuating means may be substituted in lieu of the illustrated cartridge devices. For example, a selectively controlled pneumatic pressure source may be utilized in lieu thereof.

Having briefly explained the board operational principles of the subject invention, reference is now drawn to FIG. 2 which more specifically discloses the valve assembly 2 prior to the actuation thereof. As shown, the cylindrical member 3 is selectively fabricated to provide a relatively stationary portion 3a and a breakaway plug type portion 3b. As heretofore stated, portion or rod 3a is positively secured by the circumferential weld bead 4 to a wall portion of the tank 1 and remains in relatively stationary position during all phases of valve actuation. As will be hereinafter explained, portion 3b is adapted to separate from the relatively stationary portion 3a and moved axially away therefrom in a rightward direction as viewed in FIG. 2.

The relatively stationary portion 3a of member 3 terminates at a first end thereof in an extended portion 10 which protrudes through a hole 11 formed in the wall of tank 1. A flange portion 12 of member 3 projects radially from member 3 and is constructed and arranged to abut against the tank wall to provide for expeditious securance thereto by the circumferential weld bead 4. The member 3 is threadably engaged with the housing 5 by thread means 13. A circumferentially extending retaining groove 14 is formed on the periphery of portion 3a and functions to retain a conventional type O-ring sail 15 therein for sealing purposes. An inlet port 16 extends the full length of cylindrically-fashioned portion 3a and provides for the reception of a pressurized fluid from tank 1 therein.

A cylindrically formed rupture joint portion 19 operatively connects the relatively stationary portion 3a with the portion 3b. The rupture joint portion 19 is prefabricated to withstand the pressurized fluid in tank 1, but as will be hereinafter explained, such a rupture joint portion is tensionally weak enough to brake and permit the subsequent rightward movement of 3b when such a portion is actuated with a sufficient force in that direction.

The portion 3b of member 3 comprises a frusto-conically shaped surface portion 20 having its larger end positioned adjacent the rupture joint portion 19. A cylindrically shaped bearing portion 21 cooperates with a bearing guide surface 22 formed in the housing 5 to provide for axial guidance of the portion 3b during the actuating movements thereof. A frusto-conically shaped seat portion 23 is internally formed in the bulkhead portion of the housing 5 and is preferably constructed and arranged in congruent relationship relative to the tapered surface portion formed on portion 3b.

Member 3 terminates at its extreme right-hand end, as viewed in FIG. 2, in a shoulder portion 24 which is adapted to bear against a collar member or piston 25 secured thereto by thread means 26. A retaining nut 27 functions to axially press the collar member 25 against the shoulder portion 24 of member 3.

A first split ring member 28 of the conventional type is radially and axially retained in a first groove 29 circumferentially formed on the collar member 25 and functions to restrict the flow of fluids thereby. A second split ring member 30 is retained in a second circumferentially extending groove 31 also formed on the periphery of collar member 25. As will be hereinafter explained, the split ring 30 not only functions to provide a sealing action thereat, but further functions to cooperate with a circumferentially extending retaining shoulder portion 32 formed in casing 5 to lock the portion 3b of member 3 in a relatively stationary position to assure maximum flow through inlet port 16 and outlet ports 6.

Two juxtaposed actuating ports 33 are formed in the casing 5 and are operatively connected with the hereinbefore described pyrotechnic cartridges 7. The cartridges 7 function to subject an operative face portion 34 of the collar member 25 to a highly pressurized actuating gas injected into a circumferentially extending manifold type actuating chamber 35. Such chamber 35 is formed as a cylindrical cavity in the valve casing or housing 5 in which the piston 25 is driven rearwardly by gas pressure from explosion of the cartridges 7. Reference numeral 36 designates an inside transverse surface of the housing defining the front end of the chamber or cavity 35.

An end plug member 40 is securely engaged with housing 5 by thread means 41. A circumferentially extending chamfered portion 42 is formed on housing 5 and functions to wedge a conventional type O-ring seal 43 therein when the end plug member 40 is threadably engaged with said housing. Such a sealing arrangement functions to aid in the protection of the inner workings of the valve assembly from contaminated environments.

*Method of operation*

When it is desired to release the pressurized fluid retained in the tank 1 of FIG. 1, an operator or control apparatus actuates a conventional switch means (not shown) to permit an electrical current flow through connections 8 to provide a sufficient heat source in pyrotechnic cartridge 7 to ignite the explosive type powder contained therein. As clearly shown in FIG. 2, the pressurized actuating gas expelled from the pyrotechnic cartridge is forced into the actuating ports 33 and the manifold type actuating chamber 35. When the force therein reaches a pre-determined level, such force is operative to bear against wall portion 34 of collar member 25 to urge portion 3b away from portion 3a. Simultaneously therewith, the rupture joint portion 19 is subjected to sufficient tension to breaks and thus permit the axial movement of portion 3b of member 3 in a rightward direction relative to portion 3a.

As clearly shown in FIG. 3, the piston type portion 3b of member 3 moves in a rightward direction in the cylindrical cavity 35 a pre-determined distance until securely wedged into the congruently tapered seat portion 23 formed in the bulkhead portion of valve housing 5. Simultaneously therewith as more clearly shown in FIG. 4, the split ring member 30 axially passes the shoulder portion 32, formed in housinig 5, and expands into locking engagement therewith (i.e., portion 3b is locked in wedged position within bulkhead portion.

With such a structural arrangement, it is apparent that the pressurized fluid contained in tank 1 is permitted to freely flow out of the inlet port 16 and through the outlet ports 6. With the hereinbefore explained valve construction, such flow is not restricted when the structure encounters severe vibrational environments prevalent in high speed missile operations, for example. Also, it is to be noted that the tapered plug portion 20, when seated as shown in FIG. 3, functions to seal the pyrotechnic manifold type actuating chamber 35 from the outlet ports 6 and further functions to incrementally absorb the shock of impact generated during the closing movements of portion 3b.

The performance characteristics of the valve embodiment disclosed in FIGS. 1–4 inclusive were determined by means of a conventional testing circuit as shown in FIG. 5. In particular, the primary purpose of the tests were to compare the predetermined theoretical evaluations with the actual test results. The compiled data was primarily useful in determining: (1) the actuating pressures at which the rupture portion 19 broke, (2) the amount of leakage at the tapered plug portion 20 and tapered seat portion 23 subsequent to the separation of portions 3a and 3b, and (3) the comparative difference in dimensional measurements of tthe valve elements before and after the test run.

Air comprising approximately 50 p.s.i.g. was supplied into the valve inlet port 16 by means of a standard fluid circuit 44 which was operatively connected to an air source generally noted at 45. A pressure gage 46 of the fluid circuit 45 was operatively secured closely adjacent thereto for visually noting the sudden decay of the pressure thereat when the portion 3a disconnected from portion 3b. Adapter plug members 47 were operatively secured to the outlet ports 6 of the valve to prevent fluid flow therethrough. A closely controlled and highly pressurized air source 48 was operatively connected to one of the actuating ports 33 of the valve assembly by means of a conventional fluid circuit generally noted at 49.

Two test runs were made by selectively energizing the air source 48. Separation of portion 3b from portion 3a occurred at 4000 p.s.i.g. and 3750 p.s.i.g., respectively. These figures compared favorably with a precalculated rupture pressure of 3500 p.s.i.g. In each case the time lag, between the instant the signal was given to actuate the tested valve, to the instant a sudden decay of pressure was visually noted on gage 46 (indicating breakage of rupture portion 20), closely approximated 40 milliseconds.

In each instance of shaft member 3 rupture, the tapered plug portion 20 of portion 3b was propelled with extreme force into the tapered seat portion 23 of housing 5. An axial load in excess of 2000 pounds was required, in each case, in order to separate portion 3b from portion 3a. Prior to each separation, an air leak check was made on both sides of portion 3b. No leakage was observed through a pressure range of 0–4500 p.s.i.g. Following the two tests, the housing 5 was inspected to determine any dimensional warpage thereof. Subsequent to both of the test runs, all critical dimensions compared satisfactorily with the measurements made prior to the tests and in each case the housing was considered re-usable.

A third test was made in which the inlet port 16 was subjected to a progressively increased hydrostatic pressure through the fluid circuit 44. The pressure was slowly and uniformly increased until a breakage of rupture portion 19 occurred at approximately 16,800 p.s.i.g.

From the above test runs it was concluded that the shaft rupture test data compared very favorably with the precalculated theoretical values. It was further noted, in view of the above described third test, that a premature rupturing of rupture portion 19, due to a contained pressurized constituent, was highly unlikely.

FIG. 6 discloses a valve embodiment employing the novel concepts of this invention. The main overall purpose thereof is to provide a relatively non-complex, disposable type safety valve system substantially void of elastomerized material and which may be stored and continuously subjected to relatively high pressures over a relatively long duration. This particular embodiment incorporates the novel concepts as disclosed in the hereinbefore discussed relatively sophisticated type embodiment of FIGS. 1–4 inclusive.

A tank 50 is adapted to contain a pressurized liquid propellant therein, for example. A valve assembly, generally noted at 51, comprises a member which is similar in construction to the member 3 shown in FIG. 2. The member comprises a stationary bracket portion 52 which may be welded or secured by other conventional means to said tank and a rearwardly extending breakaway rod portion 53. A rupture joint portion 54 is selectively constructed and arranged to structurally connect stationary bracket portion 52 and the breakaway portion 53.

An inlet passage 55 is formed in member 51 and adapted to contain and subsequently transmit the pressurized liquid constituent contained therein. Two discharge passages 56 are formed in an outer casing member 57. The casing member 57 is securely fastened to member 50 by any desired conventional thread or weld means, etc. The casing member may also be alternatively secured to portion 52 in a press-fit relationship, as shown. A cylindrical sleeve type number 58 is constructed and arranged within member 57 and comprises a tapered seat portion 59, two juxtaposed discharge ports 60 which are axially aligned with ports 56, as shown, and a bearing guide surface means 61. Two juxtaposed lower actuating ports 62 are formed in the casing member 57 and are operatively associated with a manifold type actuating chamber or cavity 63 to provide for an actuating function similar to that hereinbefore disclosed in regards to the actuating port construction 33 of the first preferred embodiment. The forward end of the chamber or cavity 63 is defined by the transversely extending rear end surface of the sleeve 58.

Portion 53 has a tapered surface portion 64 which is constructed and arranged to cooperate with the seat portion 59 to provide for a sealing action therebetween when portion 53 is forced away relative to tank 50. Two conventional type O-ring seals 65 are constructed and arranged to provide a sealing function on the periphery of a collar or piston member 66 which is threadably mounted on portion 53 by thread means 67. The internally threaded collar member 66 is securely held in place by means of a standard nut member 68.

The method of operation of the second preferred embodiment is substantially similar to that of the first preferred embodiment. A selectively controlled actuating force of the pneumatic or pyrotechnically generated gas type is imparted through actuating ports 62 into actuating chamber 63 to cause a precalculated breakage of the rupture joint portion 54 to thus permit the subsequent unrestricted sequential flow of fluid through passages 55, ports 60 and ports 56, respectively.

FIGS. 7 and 8 disclose a sub-combination type embodiment more particularly illustrating the novel concepts of this invention. Such an embodiment more particularly elucidates the sub-combination or tensional type rupture joint concepts of this invention. A pipe member 70, which is adapted to contain a pressurized fluid therein, is threadably engaged at 71 with a fluid receiving and containing first passage portion of a member 72. Member 72 may be secured to a wall member 73 by standard screw means 74, for example, which screws are adapted to extend through a radially extending flange portion 75 of member 72 and into threaded engagement with the wall member 73. Member 72 is further constructed and arranged to form a relatively thin-walled rupture portion 76 having a wall thickness "a" (continuously in tension) which is structurally connected to an end plate portion 77. Such a structural arrangement thus functions to form a second passage or actuating chamber portion 78 thereat, which second passage portion cooperates with said first passage portion for the reception of said fluid therein.

The member 72, or only the burst diaphragm portion 76 thereof, is preferably constructed of a material which is susceptible to structural weakening (preferably and primarily due to the incremental melting thereof) when subjected to a predetermined temperature. Such a material may comprise, for example, antimony, lead, pure bismuth (and alloys thereof, such as Lipowitz' metal or Wood's metal, etc.). As more clearly shown in FIG. 8, the melting or otherwise effected strength reduction of such a utilized material to the predetermined thickness "b," for example, will function to permit a tensional breaking of the ruptured joint portion 76 due to the total downward force imparted to the end plate portion 77 by means of the pressurized fluid contained in chamber 75.

The FIGS. 7 and 8 embodiment may find utility in many applications, for example, a fire control system wherein the fire extinguishing medium may be contained in conduit 70 and subsequently functions to discharge upon the breaking of ruptured joint 76 due to a predetermined temperature imparted thereto. Also, such an embodiment could be utilized in the process of mixing chemical constituents such as rocket propellants, for example, wherein it is desired to inject a predetermined quantity of a constituent contained in conduit 70. Such an injectoin may be precalculated to be dependent upon a predetermined temperature level sensed by the rupture joint portion 76. Alternatively, the rupture joint portion may be chemically weakened by the mixed constituents, for example.

Although this invention has been described and illustrated in detail, it is to be understood that the same is by way of illustration and example only and is not to be taken by way of limitation, the spirit and scope of this invention being limited only by the terms of the appended claims.

We claim:

1. A pressure actuated valve comprising a housing having a longitudinal passage formed therein and at least one outlet port formed laterally of and connected to said passage, a member constructed and arranged to extend into said passage, said member comprising: a first portion operatively secured to said housing and having a longitudinal passage formed therein adapted to receive a pressurized fluid, a second portion axially alined with said first portion and constructed and arranged for sliding movements in said passage when said first and seocnd portions are disconnected, rupture means separating said outlet port and the passage formed in said first portion and operatively connecting said first and second portions for permitting relative axial movement therebetween when subjected to predetermined axial tension therein, said second portion comprising tapered sealing means cooperating with tapered seat means formed in said housing passage for stopping fluid flow thereby, and lock means cooperating with shoulder means formed in said housing passage for locking and preventing retrograde movement of said second portion relative to said housing when said second portion moves a predetermined distance relative to said first portion, and actuating means operatively connected to said housing for cooperating with said second portion for breaking said rupture means and simultaneously urging said second portion away from said first portion whereby said lock means cooperates with said shoulder means to thereby permit unrestricted flow of a fluid through said first portion passage and said outlet port, in an extreme vibrational environment.

2. A pressure actuated valve comprising a valve housing adapted to be connected adjacent the front end of the housing to a container for conducting fluid from the container, the housing having inside surfaces including a transverse surface defining a cylindrical cavity extending rearwardly in the housing from said transverse surface, a piston adapted to move rearwardly in the cavity, the housing having means for admitting fluid pressure into the cavity between the piston and said transverse surface, the housing having an outlet port positioned between said front end and said transverse surface, a rod secured in the housing forwardly of said outlet port and connected to the piston, the valve having an inlet port extending from the front end of the housing rearwardly in the rod and being closed at its inner end, the rod having a weakened portion adjacent the inner end of said inlet port whereby when fluid pressure is introduced into the cavity to drive the piston rearwardly, the rod will become broken at said weakened portion thereby to open said inlet port to said outlet port.

3. A pressure actuated valve comprising a valve housing adapted to be connected adjacent the front end of the housing to a container for conducting fluid from the container, the housing having inside surfaces including a transverse surface defining a cylindrical cavity extending rearwardly in the housing from said transverse surface, a piston adapted to move rearwardly in the cavity, the housing having means for admitting fluid pressure into the cavity between the piston and said transverse surface, the housing having an outlet port positioned between said front end and said transverse surface, the housing having an inside passage extending rearwardly to said transverse surface and forwardly to said outlet port, a rod connected to the piston and adapted to slide rearwardly in said passage, the rod being secured at the front end thereof to the housing, the valve having an inlet port extending from the front end of the housing rearwardly into the rod and being closed at its inner end, the rod having a weakened portion encircling the said inlet port whereby when fluid pressure is introduced into said cavity to drive the piston rearwardly, the rod will become broken at said weakened portion thereby to open said inlet port to said outlet port.

4. A pressure actuated valve comprising a valve housing adapted to be connected adjacent the front end of the housing to a container for conducting fluid from the container, the housing having inside surfaces including a transverse surface defining a cylindrical cavity extending rearwardly in the housing from said transverse surface, a piston adapted to move rearwardly in the cavity, the housing being adapted for connection of an explosive cartridge with the products of explosion passing into the cavity between the piston and said transverse surface to drive the piston rearwardly in the cavity, the housing having an outlet port positioned between and spaced from said front end and said transverse surface, the housing having an inside passage extending rearwardly to said transverse surface and frontwardly to said outlet port, a rod connected to the piston and adapted to slide rearwardly in said passage as a result of said explosion, the rod being secured at the front end thereof to the housing, the valve having an inlet port extending from the front end of the housing rearwardly into the rod and being closed at its inner end adjacent the outlet port, the rod having a weekened portion encircling said inlet port whereby when explosion products pass into said cavity to drive the piston rearwardly, the rod will become broken at said weakened portion thereby to open said inlet port to said outlet port, and interengageable sealing means on the rod and in the body around said passage to prevent flow of explosion products from said cavity to said outlet port.

5. A valve comprising a valve housing adapted to be connected adjacent the front end of the housing to a container for conducting fluid from the container, the housing having an outlet port and an inside passage extending rearwardly from said outlet port, a rod in said passage, said rod being secured at its front end to the housing, the valve having an inlet port extending from the front end of the housing rearwardly into the rod and being closed at its inner end, the rod having a weakened portion encircling the said inlet port, and means for exerting tension upon the rod to break the rod at said weakened portion and to pull the broken portion of the rod rearwardly away from the forwardly secured portion of the rod thereby to open said inlet port to said outlet port.

References Cited by the Examiner

UNITED STATES PATENTS

| | | | |
|---|---|---|---|
| 2,515,068 | 7/50 | Young | 137—68 X |
| 2,712,881 | 7/55 | Mathisen | 220—47 |
| 2,997,051 | 8/61 | Williams | 137—68 |

FOREIGN PATENTS 152,689   4/52   Australia.

OTHER REFERENCES

Explosive Actuated Valves by Maurice M. Connell, published Sept. 24, 1956, Catalog 5501–KV.

ISADOR WEIL, *Primary Examiner*.

M. CARY NELSON, *Examiner*.